(12) United States Patent
Jiang

(10) Patent No.: US 12,737,025 B2
(45) Date of Patent: Sep. 15, 2026

(54) POWER SOURCE SWITCHING CIRCUIT AND ELECTRONIC DEVICE

(71) Applicant: Honor Device Co., Ltd., Shenzhen (CN)

(72) Inventor: Huarong Jiang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 39 days.

(21) Appl. No.: 18/856,715

(22) PCT Filed: Sep. 8, 2023

(86) PCT No.: PCT/CN2023/117841
§ 371 (c)(1),
(2) Date: Oct. 14, 2024

(87) PCT Pub. No.: WO2024/067031
PCT Pub. Date: Apr. 4, 2024

(65) Prior Publication Data

US 2025/0224792 A1 Jul. 10, 2025

(30) Foreign Application Priority Data

Sep. 29, 2022 (CN) ......................... 202211203370.6

(51) Int. Cl.
*G06F 1/3206* (2019.01)
*G06F 1/3296* (2019.01)
(Continued)

(52) U.S. Cl.
CPC .......... *G06F 1/3206* (2013.01); *G06F 1/3296* (2013.01); *H02M 1/0032* (2021.05);
(Continued)

(58) Field of Classification Search
CPC .. G06F 1/3206; G06F 1/3296; H02M 1/0032; H02M 1/0045; H02M 3/158; H02M 3/1566
See application file for complete search history.

(56) References Cited

U.S. PATENT DOCUMENTS 9,703,366 B2 * 7/2017 Jeon ......................... G11C 5/14
9,761,280 B2 9/2017 Kim et al.
(Continued)

FOREIGN PATENT DOCUMENTS

CN 104753344 A 7/2015
CN 106095060 U 11/2016
(Continued)

*Primary Examiner* — Nimesh G Patel
(74) *Attorney, Agent, or Firm* — Conley Rose, P.C.

(57) ABSTRACT

A power source switching circuit and an electronic device. The power source switching circuit includes a system power source, a BUCK power supply system, an LDO power supply system, and a power source management chip. The LDO power supply system includes an LDO chip and a first switch circuit, the LDO chip is coupled to the system power source, the LDO chip is in a working state, and the power source management chip is coupled to the LDO chip by using the first switch circuit. The BUCK power supply system includes a BUCK chip and a second switch circuit, the BUCK chip is coupled to the system power source, the power source management chip is coupled to the BUCK chip by using the second switch circuit, and the power source management chip controls a status of the BUCK chip.

18 Claims, 2 Drawing Sheets

(51) Int. Cl.

| | |
|---|---|
| ***H02M 1/00*** | (2007.01) |
| ***H02M 3/156*** | (2006.01) |
| ***H02M 3/158*** | (2006.01) |

(52) U.S. Cl.

CPC ....... *H02M 1/0045* (2021.05); *H02M 3/1566* (2021.05); *H02M 3/158* (2013.01)

(56) References Cited

U.S. PATENT DOCUMENTS

| | | | | |
|---|---|---|---|---|
| 10,423,174 | B1 * | 9/2019 | Sonntag .................. | H02M 1/08 |
| 2009/0072626 | A1 | 3/2009 | Watanabe et al. | |
| 2010/0060078 | A1 * | 3/2010 | Shaw ...................... | H02M 1/36<br>307/31 |
| 2014/0237271 | A1 * | 8/2014 | Takase .................... | G06F 1/263<br>713/300 |
| 2016/0111134 | A1 * | 4/2016 | Kim ....................... | G11C 5/143<br>365/226 |
| 2017/0271972 | A1 | 9/2017 | Zhao et al. | |
| 2018/0254530 | A1 * | 9/2018 | Wigney .............. | H01M 10/425 |
| 2020/0321875 | A1 * | 10/2020 | Bogue ................... | H02M 3/158 |
| 2021/0135473 | A1 * | 5/2021 | Wigney .............. | H01M 10/425 |
| 2022/0416662 | A1 | 12/2022 | Huang et al. | |

FOREIGN PATENT DOCUMENTS

| | | | |
|---|---|---|---|
| CN | 111313689 | A | 6/2020 |
| CN | 111555616 | A | 8/2020 |
| CN | 211701852 | U | 10/2020 |
| CN | 112787505 | A | 5/2021 |
| CN | 213637179 | U | 7/2021 |
| CN | 215681904 | U | 1/2022 |
| CN | 217335186 | U | 8/2022 |
| CN | 217363075 | U | 9/2022 |
| EP | 3722137 | A1 | 10/2020 |
| EP | 4050783 | A1 | 8/2022 |
| JP | 2008048547 | A | 2/2008 |
| JP | 2012226677 | A | 11/2012 |

* cited by examiner

POWER SOURCE SWITCHING CIRCUIT AND ELECTRONIC DEVICE

CROSS-REFERENCE TO RELATED APPLICATIONS

This is a U.S. National Stage of International Application No. PCT/CN2023/117841, filed on Sep. 8, 2023, which claims priority to Chinese Patent Application No. 202211203370.6, filed on Sep. 29, 2022, both of which are hereby incorporated by reference in their entireties.

TECHNICAL FIELD

Embodiments of this application relate to the field of circuit technologies, and in particular, to a power source switching circuit and an electronic device.

BACKGROUND

In communication and computer fields, various electronic devices including consumer electronic devices need to keep working by using power sources. In an electronic device (for example, a notebook computer) using a direct current source, a voltage converter (voltage regulator) needs to be used to convert a voltage of a power source (for example, a battery) into a required working voltage.

Currently, a commonly used voltage converter is a DCDC converter (DCDC is "direct current voltage to direct current voltage", but currently, the industry mostly uses DCDC to represent a switch power source). The DCDC converter can implement buck (buck), boost (boost), and buck-boost (buck-boost) based on a topology of the DCDC converter. A DCDC converter that implements a buck function is usually referred to as a BUCK-type DCDC.

The BUCK-type DCDC has an advantage of high conversion efficiency. However, a quiescent current (a current flowing through a ground pin when the BUCK is unloaded) of the BUCK is large, which tends to cause a power loss. Therefore, for a mobile electronic device that always requires a longer battery life, an excessively large quiescent current is unfavorable.

Another commonly used buck converter is an LDO (low-dropout linear regulator). The LDO has advantages of quick load response, low noise, and the like, but the LDO has a main disadvantage of low conversion efficiency compared with the BUCK-type DCDC.

With development of science and technologies, to improve use experience of a user of a notebook computer, a function that the notebook computer is automatically powered on once a lid of the notebook computer is opened needs to be implemented. Therefore, the notebook computer needs to be powered in a power-off state (when the upper lid is closed).

In the power-off state, a system is in a light-load mode. Therefore, in the power-off state, the LDO is usually used to supply power to reduce power consumption of the system. However, in a power-on state, if the LDO continues being used to supply power, because the system is in a relatively-heavy-load mode, efficiency of the LDO is excessively low, causing serious heating of the device. Therefore, the BUCK-type DCDC usually needs to be used to supply power. Therefore, how to efficiently supply power to the notebook computer from the power-off state to the power-on state becomes a problem that urgently needs to be resolved.

SUMMARY

This application provides a power source switching circuit and an electronic device. The power source switching circuit and the electronic device may select, based on different working states of a notebook computer, a suitable power supply system to supply power, to be specific, when the notebook computer is in a power-off state, provide a power supply system with low power consumption for the notebook computer to prolong a battery life of the notebook computer, and when the notebook computer is in a normal working state, provide an efficient power supply system for the notebook computer to ensure normal working of the notebook computer and improve working efficiency of a system.

According to a first aspect, this application provides a power source switching circuit. The power source switching circuit is applied to a notebook computer, and includes a system power source, a BUCK power supply system, an LDO power supply system, and a power source management chip. The LDO power supply system includes an LDO chip and a first switch circuit, the LDO chip is coupled to the system power source, the LDO chip is in a working state, and the power source management chip is coupled to the LDO chip by using the first switch circuit. The BUCK power supply system includes a BUCK chip and a second switch circuit, the BUCK chip is coupled to the system power source, the power source management chip is coupled to the BUCK chip by using the second switch circuit, and the power source management chip controls a status of the BUCK chip. Both the first switch circuit and the second switch circuit are coupled to the BUCK chip, and the BUCK chip controls one of the first switch circuit and the second switch circuit to be in a closed state.

Based on the above, the two power supply systems are disposed, so that a suitable power supply system can be selected to supply power to the notebook computer in different states. For example, in a power-off state, the LDO power supply system is used to supply power to prolong a battery life of the notebook computer; and in a power-on state, the BUCK power supply system is used to supply power to improve power supply efficiency of a power source of the notebook computer. The first switch circuit and the second switch circuit are disposed, and control terminals of the first switch circuit and the second switch circuit are coupled to the BUCK chip of the BUCK power supply system, so that closing and opening of the first switch circuit and the second switch circuit can be controlled by controlling the status of the BUCK, thereby implementing switching between the BUCK power supply system and the LDO power supply system. In this application, in the power source switching circuit, an existing BUCK chip and LDO chip in the notebook computer may be used, and switching between different power supply systems may be performed by disposing the switch circuits, without a need to newly add an electronic element or use an integrated power source chip, so that costs of the notebook computer can be reduced.

In a possible design manner of the first aspect, the status of the BUCK chip includes a working state and a non-working state. When the BUCK chip is in the non-working state, the first switch circuit is in the closed state, and the second switch circuit is in an open state; or when the BUCK chip is in the working state, the first switch circuit is in an open state, and the second switch circuit is in the closed state.

Based on the above, the BUCK chip is set to be in the working state or the non-working state to control closing and opening of the first switch circuit and the second switch circuit. A circuit structure is simple, and no additional control element needs to be added.

In a possible design manner of the first aspect, the first switch circuit includes a first switching transistor, a control terminal of the first switching transistor is coupled to the BUCK chip, and the BUCK chip controls a connection status of the first switching transistor. One end of a switching channel of the first switching transistor is coupled to the LDO chip, and the other end of the switching channel is coupled to the power source management chip.

Based on the above, the first switching transistor is set to be conducted or cut off to control closing and opening of the first switch circuit. A circuit structure is simple. The first switching transistor may be an electronic switching component such as a field effect transistor or a bipolar junction transistor, and costs are low.

In a possible design manner of the first aspect, the second switch circuit includes a second switching transistor and a third switching transistor, a control terminal of the second switching transistor is coupled to the BUCK chip, and the BUCK chip controls a connection status of the second switching transistor. A control terminal of the third switching transistor is coupled to a switching channel of the second switching transistor, and the connection status of the second switching transistor controls a connection status of the third switching transistor. One end of a switching channel of the third switching transistor is coupled to the BUCK chip, and the other end of the switching channel is coupled to the power source management chip.

Based on the above, a form of a combination of the second switching transistor and the third switching transistor is disposed to control closing and opening of the second switch circuit. A circuit structure is simple. In addition, the second switching transistor and the third switching transistor each may be an electronic switching component such as a field effect transistor or a bipolar junction transistor, and costs are low.

In a possible design manner of the first aspect, the first switching transistor is a P-MOS transistor, a source of the first switching transistor is coupled to an output pin of the LDO chip, a drain of the first switching transistor is coupled to the power source management chip, and a gate of the first switching transistor is coupled to a power good pin of the BUCK chip. This design manner shows a specific structure of the first switching transistor, and shows a specific connection manner of the first switching transistor in the first switch circuit.

In a possible design manner of the first aspect, the second switching transistor is an N-MOS transistor, and the third switching transistor is a P-MOS transistor. A drain and a source of the second switching transistor are respectively coupled to the system power source and a reference ground potential, and a gate of the second switching transistor is coupled to a power good pin of the BUCK chip. A source of the third switching transistor is coupled to an output pin of the BUCK chip, a drain of the third switching transistor is coupled to the power source management chip, and a gate of the third switching transistor is coupled to the drain of the second switching transistor. This design manner shows specific structures of the second switching transistor and the third switching transistor, and shows a specific connection manner of the second switching transistor and the third switching transistor in the second switch circuit.

In a possible design manner of the first aspect, the power source switching circuit further includes a sensor. The sensor is configured to detect opening/closing of the notebook computer. The sensor is coupled to the first switch circuit and the second switch circuit, and the sensor is coupled to the power source management chip to send a detection signal to the power source management chip.

Based on the above, the sensor is disposed to detect an open/closed state of the notebook computer, to determine whether the notebook computer is in the power-off state or a state, so that a corresponding power supply system is selected based on a detection result of the sensor to supply power to the notebook computer.

In a possible design manner of the first aspect, the source management chip sends a control signal to the BUCK chip based on the detection signal sent by the sensor. When the control signal is a low-level signal, the BUCK chip is controlled to be in the non-working state; or when the control signal is a high-level signal, the BUCK chip is controlled to be in the working state. This design manner shows an implementation of controlling the status of the BUCK chip.

According to a second aspect, this application provides an electronic device. The electronic device is a notebook computer, and the notebook computer includes the power source switching circuit according to any one of the first aspect and the possible design manners of the first aspect.

It may be understood that for beneficial effects that can be achieved by the electronic device that is described in the second aspect and that is provided above, refer to the beneficial effects in any one of the first aspect and the possible design manners of the first aspect. Details are not described herein again.

DESCRIPTION OF EMBODIMENTS

Figure 1:
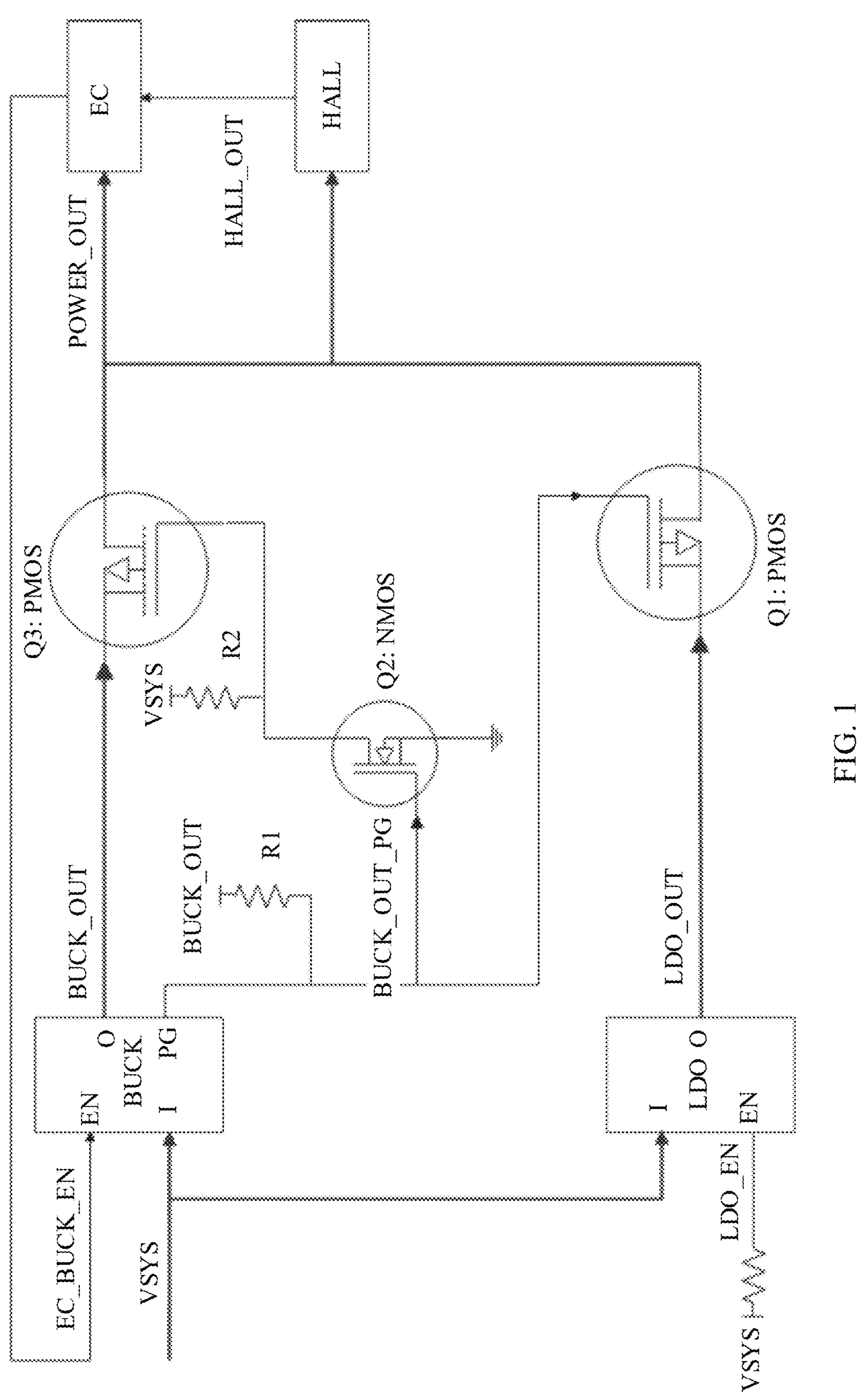
FIG. 1 is a circuit diagram of a power source switching circuit according to an embodiment of this application.

The following describes the technical solutions in this application with reference to the accompanying drawings.

In the embodiments of this application, words such as "example" or "for example" are used to represent giving an example, an illustration, or a description. Any embodiment or design solution described as "example" or "for example" in the embodiments of this application should not be construed as being more preferred or advantageous than other embodiments or design solutions. Exactly, the words such as "example" or "for example" are intended to present related concepts in a specific manner.

In the embodiments of this application, the terms "first" and "second" are merely used for the purpose of description, and should not be understood as an indication or implication of relative importance or an implicit indication of a quantity of indicated technical features. Therefore, features defined with "first" or "second" may explicitly or implicitly include one or more of the features.

It should be understood that the terms used in the descriptions of the various examples in this specification are intended for describing specific examples only rather than limiting them. As used in the descriptions of the various examples, singular forms "one" ("a" or "an") and "the" are intended to include plural forms as well, unless otherwise explicitly indicated in the context.

In this application, "at least one" means one or more, and "a plurality of" means two or more. "At least one of the following items" or a similar expression means any combination of these items, including any combination of a single item or a plurality of items. For example, at least one of a, b, or c may represent a, b, c, a-b, a-c, b-c, or a-b-c, where a, b, and c may be singular or plural.

It should be further understood that the term "and/or" used in this specification refers to and covers any of and all possible combinations of one or more associated listed items. The term "and/or" describes an association relationship between associated objects, and indicates that three relationships may exist. For example, "A and/or B" may indicate the following three cases: Only A exists, both A and B exist, and only B exists. In addition, the character "/" in this application usually represents an "or" relationship between associated objects.

It should be further understood that in this application, unless otherwise specified and defined explicitly, the term "connection" should be understood in a broad sense. For example, a "connection" may be a fixed connection, a sliding connection, a detachable connection, or an integral connection; or may be a direct connection, or an indirect connection using an intermediate medium.

It should be further understood that the term "include" (also referred to as "includes", "including", "comprises", and/or "comprising"), when used in the specification, specifies the presence of stated features, integers, steps, operations, elements, and/or components, but does not preclude the presence or addition of one or more other features, integers, steps, operations, elements, components, and/or groups thereof.

It should be understood that "an embodiment", "another embodiment", or "a possible design manner" mentioned throughout the specification means that particular features, structures, or characteristics related to the embodiments or the implementations are included in at least one embodiment of this application. Therefore, "in an embodiment of this application", "in another embodiment of this application", or "in a possible design manner" that occurs everywhere throughout the specification may not necessarily refer to the same embodiment. In addition, these specific features, structures, or characteristics may be combined in one or more embodiments in any appropriate manner.

To facilitate understanding of the technical solutions of this application, the technical background related to the technical solutions of this application is first simply described before the embodiments of this application are drafted.

The technical solutions of this application are mainly applied to a notebook computer or a product similar to the notebook computer. In a process of using such a product, an upper lid with a display screen is usually separated from a body, and a specific angle is retained between the upper lid and the body. When the product does not need to be used, the upper lid is usually closed on the body, so that space occupation is reduced. In the embodiments of this application, the notebook computer is used as an example to describe a power source switching circuit.

In a conventional notebook computer, after an upper lid is closed on a body, the computer is usually in a power-off state. After the upper lid is re-opened, a user may need to perform operations such as power-on and startup again, which is cumbersome. To improve use experience of the notebook computer, a function that the notebook computer is automatically powered on once the lid of the notebook computer is opened needs to be implemented. Therefore, the notebook computer needs to remain powered when the upper lid is closed on the body. To detect whether a lid opening operation is performed on the notebook computer, a Hall effect sensor is usually installed on the upper lid and the body of the notebook computer to monitor a lid opening action of the notebook computer. Using the Hall effect sensor to detect whether the lid of the notebook computer is opened belongs to the conventional technology. Details are not described in this application.

In the power-off state, the notebook computer does not need to perform corresponding task processing, and power is mainly supplied to a power source management chip and the Hall effect sensor. In this case, the notebook computer is in a light-load mode, and generates low power consumption. A power supply system with low power consumption may be used. An LDO power supply system is usually used. After the lid of the notebook computer is opened, each system runs normally, and the notebook computer is in a relatively-heavy-load mode. In this case, a working current is large. If the LDO system continues being used to supply power, conversion efficiency of the LDO power supply system is excessively low, which tends to cause serious heating of the device. Therefore, after the lid of the notebook computer is opened, a BUCK power supply system is usually used to supply power to improve working efficiency of the notebook computer in a power-on state.

In the conventional technology, one power supply system is usually used to supply power to the notebook computer. For example, only the BUCK power supply system is used to supply power to the notebook computer. In other words, after the notebook computer is powered on, the BUCK power supply system is used to supply power to the notebook computer. The following functions cannot be implemented: Power continues being supplied to the notebook computer after the upper lid of the notebook computer is closed, and once the lid is opened, the notebook computer is automatically powered on to switch a power supply system to the BUCK power supply system.

To properly and efficiently supply power to the notebook computer in different working modes, the embodiments of this application provide a power source switching circuit and an electronic device, to supply power to the notebook computer in different working modes by using different power supply systems, and synchronously switch a power supply system of the notebook computer when a working mode of the notebook computer is switched, so that a most efficient power supply system supplies power to the notebook computer in each of the different working modes. The following describes the embodiments of this application with reference to FIG. 1 and FIG. 2.

FIG. 1 is a circuit diagram of a power source switching circuit according to an embodiment of this application. As shown in FIG. 1, the control circuit in this embodiment of this application includes a system power source, a power source management chip, a BUCK power supply system, and an LDO power supply system. The power source management chip is connected to a Hall effect sensor. The Hall effect sensor detects opening/closing of a notebook computer, and sends a detection signal to the power source management chip. The power source management chip generates a control signal based on the received detection signal of the Hall effect sensor. Input terminals of the BUCK power supply system and the LDO power supply system are separately connected to the system power source of the notebook computer, and the input terminals of the BUCK power supply system and the LDO power supply system are separately electrically connected to the power source management chip and the Hall effect sensor, to supply power to the power source management chip and the Hall effect sensor.

The LDO power supply system includes an LDO chip and a first switch circuit, the LDO chip is electrically connected to the system power source, a first terminal of the first switch circuit is electrically connected to the LDO chip, and a second terminal of the first switch circuit is separately electrically connected to the power source management chip and the Hall effect sensor. The BUCK power supply system includes a BUCK chip and a second switch circuit, the BUCK chip is electrically connected to the system power source, a first terminal of the second switch circuit is electrically connected to the BUCK chip, and a second terminal of the second switch circuit is separately electrically connected to the power source management chip and the Hall effect sensor. Control terminals of both the first switch circuit and the second switch circuit are electrically connected to the BUCK chip, and a control signal output by the BUCK chip can control closing/opening of the first switch circuit and the second switch circuit. The first switch circuit and the second switch circuit are not in a closed state/an open state at the same time. Generally, when the first switch circuit is in the closed state, the second switch circuit is in the open state; or when the first switch circuit is in the open state, the second switch circuit is in the closed state.

Switching may be performed between the BUCK power supply system and the LDO power supply system by adjusting closing and opening of the first switch circuit and the second switch circuit, so that power is supplied to the power source management chip and the Hall effect sensor by using different power supply systems.

As shown in FIG. 1, the LDO chip includes an input (I) pin, an output (O) pin, and an enable (EN) pin, and the BUCK chip includes an input (I) pin, an output (O) pin, an enable (EN) pin, and a power good (Power Good, PG) pin. The PG pin of the BUCK chip is coupled, by using a first pull-up resistor R1, to power output by the output pin of the BUCK chip. The first switch circuit includes a first switching transistor Q1 and the first pull-up resistor R1, and the second switch circuit includes a second switching transistor Q2, a third switching transistor Q3, and a second pull-up resistor R2.

It should be noted that the first switching transistor Q1, the second switching transistor Q2, and the third switching transistor Q3 each may be an electronic switching component such as a field effect transistor or a bipolar junction transistor. In this embodiment of this application, an example in which all of the first switching transistor Q1, the second switching transistor Q2, and the third switching transistor Q3 are MOS transistors is used for description, where the first switching transistor Q1 may be a P-MOS transistor, the second switching transistor Q2 may be an N-MOS transistor, and the third switching transistor Q3 may be a P-MOS transistor. A control terminal of the first switching transistor Q1 refers to a gate of the P-MOS transistor, a control terminal of the second switching transistor Q2 refers to a gate of the N-MOS transistor, and a control terminal of the third switching transistor Q3 refers to a gate of the P-MOS transistor. Switching channels of the first switching transistor Q1, the second switching transistor Q2, and the third switching transistor Q3 are channels formed by sources and drains of the first switching transistor Q1, the second switching transistor Q2, and the third switching transistor Q3. Resistance values of the first pull-up resistor R1 and the second pull-up resistor R2 may be selected based on an actual design requirement.

As shown in FIG. 1, both the input pin and the enable pin of the LDO chip are coupled to the system power source (VSYS), to be specific, a working status of the LDO chip is controlled only by the power source, and when an electrical signal is output from the system power source, the LDO chip is in a working state. The output pin of the LDO chip is coupled to a source of the first switching transistor Q1, a drain of the first switching transistor Q1 is separately coupled to input terminals of the power source management chip and the Hall effect sensor, and the gate of the first switching transistor Q1 is coupled to the PG pin of the BUCK chip.

The input pin of the BUCK chip is coupled to the system power source (VSYS), the enable pin of the BUCK chip is coupled to a pin of the power source management chip, and the pin of the power source management chip may output an enable signal to the BUCK chip to control a working status of the BUCK chip. To be specific, the working status of the BUCK chip is controlled by the system power source and the power source management chip, and the BUCK chip is in a working state only when an electrical signal is output from the system power source, and the enable signal output from the power source management chip is at a high level.

The output pin of the BUCK chip is coupled to a source of the third switching transistor Q3, a drain of the third switching transistor Q3 is separately coupled to the input terminals of the power source management chip and the Hall effect sensor, and the gate of the third switching transistor Q3 is coupled to a drain of the second switching transistor Q2. The drain of the second switching transistor Q2 is coupled to the system power source (VSYS) by using the second pull-up resistor R2, a source of the second switching transistor Q2 is coupled to a reference ground potential (is grounded), and the gate of the second switching transistor Q2 is coupled to the PG pin of the BUCK chip.

Because an input terminal and an output terminal of the first switching transistor Q1 in the first switch circuit are respectively connected to the LDO chip and the power source management chip and the Hall effect sensor to which power needs to be supplied, conduction/cutoff of the first switching transistor Q1 directly affects closing/opening of the first switch circuit. Similarly, because an input terminal and an output terminal of the third switching transistor Q3 in the second switch circuit are respectively connected to the BUCK chip and the power source management chip and the Hall effect sensor to which power needs to be supplied, conduction/cutoff of the third switching transistor Q3 directly affects closing/opening of the second switch circuit.

The closed state/open state of the first switch circuit may be implemented by controlling a level signal of the PG pin of the BUCK chip. Specifically, because the gate of the first switching transistor Q1 is coupled to the PG pin of the BUCK chip, if the PG pin of the BUCK chip is controlled to output a low-level signal, a signal received by the gate of the first switching transistor Q1 is at a low level. Because the first switching transistor Q1 is a P-MOS transistor, the first switching transistor Q1 is in a conducted state, and the first switch circuit is in the closed state. If the PG pin of the BUCK chip is controlled to output a high-level signal, a signal received by the gate of the first switching transistor Q1 is at a high level, and the first switching transistor Q1 is in a cut-off state, and the first switch circuit is in the open state.

The closed state/open state of the second switch circuit may also be implemented by controlling the level signal of the PG pin of the BUCK chip. Specifically, because the gate of the second switching transistor Q2 is coupled to the PG pin of the BUCK chip, if the PG pin of the BUCK chip is controlled to output a high-level signal, a signal received by the gate of the second switching transistor Q2 is at a high level. Because the second switching transistor Q2 is an N-MOS transistor, the second switching transistor Q2 is in the conducted state. The source of the second switching transistor Q2 is coupled to the reference ground potential (is grounded), and the gate of the third switching transistor Q3 is coupled to the drain of the second switching transistor Q2. Therefore, when the second switching transistor Q2 is in the conducted state, both the source and the drain are at a low level, and a signal received by the gate of the third switching transistor Q3 is also at a low level. Because the third switching transistor Q3 is a P-MOS transistor, the third switching transistor Q3 is in the conducted state, and the second switch circuit is in the closed state.

If the PG pin of the BUCK chip is controlled to output a low-level signal, a signal received by the gate of the second switching transistor Q2 is at a low level. Because the second switching transistor Q2 is an N-MOS transistor, the second switching transistor Q2 is in the cut-off state. The drain of the second switching transistor Q2 is coupled to the system power source (VSYS) by using the second pull-up resistor R2, and the source of the second switching transistor Q2 is coupled to the reference ground potential (is grounded). Because the second switching transistor Q2 is in the cut-off state, the drain of the second switching transistor Q2 is not pulled to a low level by the reference ground potential, but is pulled to a high level by the system power source (VSYS) by using the second pull-up resistor R2. In this case, a signal received by the gate of the third switching transistor Q3 is also at a high level. Because the third switching transistor Q3 is a P-MOS transistor, the third switching transistor Q3 is in the cut-off state, and the second switch circuit is in the open state.

In this embodiment of this application, the LDO power supply system or the BUCK power supply system may be used to supply power to the power source management chip and the Hall effect sensor, and switching may be performed between closing of the first switch circuit and closing of the second switch circuit to control different power supply systems to be used to supply power to the notebook computer in different states. A specific principle is described below.

It should be noted that the technical solutions in this application are as follows: When the notebook computer is in a power-off state (an upper lid is closed on a body), the Hall effect sensor sends a first detection signal to the power source management chip, and in this case, power is supplied to the notebook computer by using the LDO power supply system. When the notebook computer is in a working state (the upper lid is in an open state, and a specific angle is retained between the upper lid and the body), the Hall effect sensor sends a second detection signal to the power source management chip, and in this case, power is supplied to the notebook computer by using the BUCK power supply system.

As shown in FIG. 1, both the input pin and the enable pin of the LDO chip are coupled to the system power source (VSYS). When the power source keeps outputting an electrical signal, the output pin of the LDO chip may also keep providing electrical signal output. Therefore, when a battery of the notebook computer is in position or an adapter is in a connected state (the system power source (VSYS) derives from output of the battery or the adapter, and therefore the system power source (VSYS) has output by default), the LDO chip also keeps outputting. When the notebook computer is in the power-off state (the upper lid is closed on the body), the LDO chip can keep outputting without any other control or operation, to supply power to the notebook computer in the power-off state.

In this embodiment of this application, a status of the notebook computer is determined mainly by detecting, by the Hall effect sensor, whether the upper lid of the notebook computer is closed on the body. When the upper lid is closed on the body, the Hall effect sensor sends the first detection signal to the power source management chip to indicate that the notebook computer is in the power-off state. After receiving the first detection signal sent by the Hall effect sensor, the power source management chip sends a low-level enable signal to the BUCK chip. Although the input pin of the BUCK is coupled to the system power source, because the signal received by the enable pin of the BUCK is a low-level signal, the BUCK chip is in a non-working state, and an output terminal of the BUCK chip outputs no electrical signal.

Because the BUCK chip is in the non-working state, in other words, the BUCK chip outputs no electrical signal, the output pin of the BUCK chip is at a low level. Because the PG pin of the BUCK chip is coupled to the output pin of the BUCK by using the first pull-up resistor R1, the PG pin is also at a low level. Because the gate of the first switching transistor Q1 is coupled to the PG pin of the BUCK chip, the signal received by the gate of the first switching transistor Q1 is also a low-level signal, and the first switching transistor Q1 is in the conducted state. Therefore, the first switch circuit is also in the closed state. The LDO chip keeps connected to the system power source, and is outputting. Therefore, the system power source may supply power to the power source management chip and the Hall effect sensor by using the LDO chip and the first switch circuit, to ensure that the notebook computer still remains powered in the power-off state. The Hall effect sensor may monitor whether the lid of the notebook computer is opened, and the power source management chip may perform corresponding control based on the detection signal of the Hall effect sensor, so that a corresponding power supply system is switched after the lid of the notebook computer is opened.

When the upper lid is separated from the body, and a specific angle is retained between the upper lid and the body, the Hall effect sensor sends the second detection signal to the power source management chip to indicate that the notebook computer is in the working state. It should be noted that the angle may be set based on an actual case. For example, if the angle between the upper lid and the body is greater than 10°, it may be considered that the notebook computer is in the working state. Certainly, in an actual use process, the angle is usually greater than or equal to 90°, so that a user can normally use the notebook computer.

After receiving the second detection signal sent by the Hall effect sensor, the power source management chip sends a high-level enable signal to the BUCK chip. In this case, the input pin of the BUCK chip is coupled to the system power source, and the signal received by the enable pin of the BUCK chip is a high-level signal. Therefore, the BUCK chip is in the working state, the output terminal of the BUCK chip is outputting, and the output pin of the BUCK chip is at a high level.

Because the output pin of the BUCK chip is at a high level, and the PG pin of the BUCK chip is coupled to the output pin of the BUCK by using the first pull-up resistor R1, the PG pin is pulled to a high level by using the pull-up resistor. Because the gate of the first switching transistor Q1 is coupled to the PG pin of the BUCK chip, the signal received by the gate of the first switching transistor Q1 is also a high-level signal, and in this case, the first switching transistor Q1 is in the cut-off state. Therefore, the first switch circuit is also in the open state.

Because the gate of the second switching transistor Q2 is also coupled to the PG pin of the BUCK chip, the signal received by the gate of the second switching transistor Q2 is also a high-level signal. Because the second switching transistor Q2 is an N-MOS transistor, the second switching transistor Q2 is in the conducted state. Because the source of the second switching transistor Q2 is connected to the reference ground potential, both the source and the drain of the second switching transistor Q2 are pulled down to a low level by the reference ground potential. Because the gate of the third switching transistor Q3 is coupled to the drain of the second switching transistor Q2, the signal received by the gate of the third switching transistor Q3 is a low-level signal. Because the third switching transistor Q3 is a P-MOS transistor, the third switching transistor Q3 is in the conducted state. Because the source and the drain of the third switching transistor Q3 are respectively coupled to the output pin of the BUCK chip and the power source management chip and the Hall effect sensor to which power needs to be supplied, the second switch circuit is in the closed state.

In this case, the BUCK chip is connected to the system power source, and is in the working state, and the second switch circuit is in the closed state. Although the LDO chip also keeps connected to the system power source, and is outputting, because the first switch circuit is in the open state, the LDO power supply system cannot supply power to the power source management chip or the Hall effect sensor. In this case, power is supplied to the power source management chip and the Hall effect sensor by using the BUCK power supply system. Therefore, switching from the LDO power supply system to the BUCK power supply system is implemented.

After the user closes the upper lid of the notebook computer on the body, the Hall effect sensor sends the first detection signal to the power source management chip. It can be learned from the foregoing descriptions that a power supply system of the notebook computer is switched to the LDO power supply system, and in this case, the BUCK power supply system does not supply power. In other words, after the upper lid of the notebook computer is closed, the power supply system of the notebook computer is switched from the BUCK power supply system to the LDO power supply system.

In the technical solutions provided in this embodiment of this application, the Hall effect sensor is used to detect opening/closing of the notebook computer, and the power source management chip controls the working status of the BUCK chip based on a detection result of the Hall effect sensor, so that closing/opening of the first switch circuit and the second switch circuit is controlled, thereby implementing switching between the LDO power supply system and the BUCK power supply system. In this way, the notebook computer working in different states can match different power supply systems.

In the power source switching circuit shown in FIG. 1, the LDO power supply system supplies power to the notebook computer by default, in other words, the notebook computer is in the power-off state by default. After the notebook computer is in the working state, the power supply system of the notebook computer is switched from the LDO power supply system to the BUCK power supply system. The following briefly describes a time sequence of power source switching performed on the notebook computer.

Figure 2:
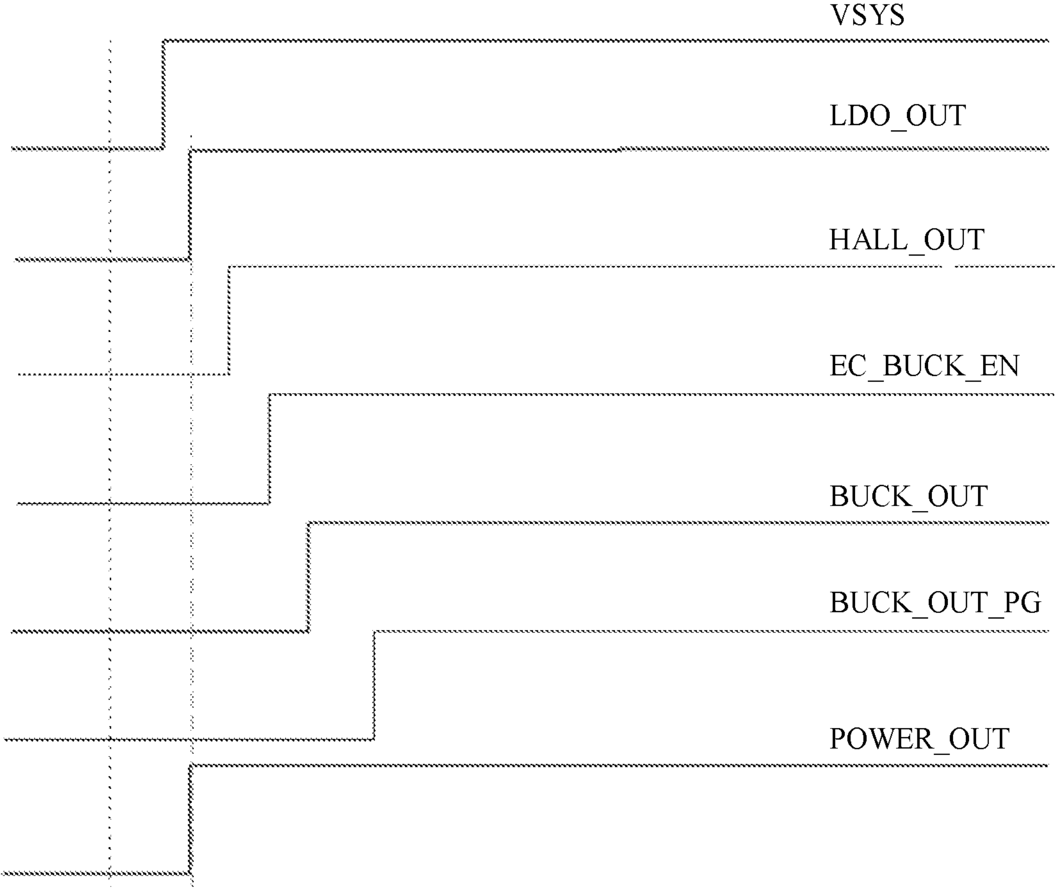
FIG. 2 is a time sequence diagram of power source switching according to an embodiment of this application.

FIG. 2 is a time sequence diagram of power source switching according to an embodiment of this application. As shown in FIG. 2, a VSYS line in FIG. 2 represents a time sequence diagram of an electrical signal of the system power source. By default, the first switching transistor Q1 is in the conducted state, and the system power source supplies power to the LDO chip, and then power is supplied to the power source management chip and the Hall effect sensor by using the LDO power supply system. An LDO_OUT line in FIG. 2 represents a time sequence diagram of a level change on the output pin of the LDO chip. The level change is slightly later than a level change time of the electrical signal of the system power source. A POWER_OUT line in FIG. 2 represents a level change time on an input terminal of the power source management chip. Because the input terminal of the power source management chip and the output pin of the chip are connected, the level change time on the input terminal of the power source management chip is the same as a level change time on the output pin of the LDO chip.

A HALL_OUT line in FIG. 2 represents a time sequence diagram of transmitting a detection signal to the power source management chip by the Hall effect sensor. A change time of the HALL_OUT line is later than the change time of LDO_OUT, and the HALL_OUT line indicates that the notebook computer switches from the LDO power supply system in a default state to the BUCK power supply system. An EC_BUCK_EN line in FIG. 2 represents a time sequence of a level change of the enable signal sent by the power source management chip to the BUCK chip. Because the enable signal is sent only after the Hall effect sensor transmits the detection signal to the power source management chip, a change time of the EC_BUCK_EN line is later than the change time of HALL_OUT. A BUCK_OUT line and a BUCK_OUT_PG line in FIG. 2 respectively represent a time sequence of a level change on the output pin of the BUCK chip and a time sequence of a level change on the PG pin of the BUCK chip. Because the BUCK chip is in the working state and outputs an electrical signal only after receiving a high-level enable signal, a level change time on the output pin of the BUCK chip is later than the change time of the enable signal sent by the power source management chip to the BUCK chip. Because the level change on the PG pin of the BUCK chip is affected by the level change on the output pin of the BUCK chip, the level change time on the PG pin of the BUCK chip is later than the level change time on the output pin of the BUCK chip.

Based on a same inventive concept, an embodiment of this application provides an electronic device. The electronic device includes the power source switching circuit described in the foregoing embodiment. The electronic device may be a notebook computer.

The foregoing descriptions are merely specific implementations of this application, but are not intended to limit the protection scope of this application. Any person skilled in the art can readily figure out variations or replacements within the technical scope disclosed in this application, and these variations or replacements shall fall within the protection scope of this application.

The embodiments in this specification are described in a progressive manner. Each embodiment focuses on a difference from other embodiments. Refer to the embodiments for same or similar parts in the embodiments.

Although preferred embodiments of the embodiments of this application have been described, a person skilled in the art can make other changes and modifications to these embodiments once they know the basic creative concept. Therefore, the protection scope of this application covers the preferred embodiments and all changes and modifications falling within the scope of the embodiments of this application.

The control circuit for switching a display status of a screen and the electronic device provided in this application are described above in detail. Although the principles and implementations of this application are described by using specific examples in this specification, the descriptions of the foregoing embodiments are merely intended to help understand the method and the core idea of this application. In addition, a person of ordinary skill in the art may make modifications to the specific implementations and the application scope according to the idea of this application. In conclusion, the content of this specification should not be construed as a limitation to this application.

The foregoing content is merely specific implementations of this application, but is not intended to limit the protection scope of this application. Any variation or replacement made within the technical scope disclosed in this application shall fall within the protection scope of this application. Therefore, the protection scope of this application shall be subject to the protection scope of the claims.

The invention claimed is:

1. A circuit, comprising:

a system power source;

a power source management chip;

a low-dropout (LDO) power supply system, comprising:

an LDO chip coupled to the system power source, wherein the LDO chip is in a working state; and a first switch circuit, wherein the power source management chip is coupled to the LDO chip by the first switch circuit; and a BUCK power supply system, comprising:

a BUCK chip coupled to the system power source; and a second switch circuit, wherein the power source management chip is coupled to the BUCK chip by the second switch circuit, and the power source management chip is configured to control a status of the BUCK chip, the second switch circuit comprising:

a second switching transistor, wherein a control terminal of the second switching transistor is coupled to the BUCK chip, and the BUCK chip is configured to control a connection status of the second switching transistor; and a third switching transistor, wherein a control terminal of the third switching transistor is coupled to a switching channel of the second switching transistor, and the connection status of the second switching transistor controls a connection status of the third switching transistor, and wherein one end of a switching channel of the third switching transistor is coupled to the BUCK chip, and the other end of the switching channel is coupled to the power source management chip, wherein both the first switch circuit and the second switch circuit are coupled to the BUCK chip, and the BUCK chip is configured to control one of the first switch circuit and the second switch circuit to be in a closed state.

2. The circuit of claim 1, wherein the status of the BUCK chip comprises a working state and a non-working state, wherein the first switch circuit is in the closed state and the second switch circuit is in an open state when the BUCK chip is in the non-working state, and wherein the first switch circuit is in an open state and the second switch circuit is in the closed state when the BUCK chip is in the working state.

3. The circuit of claim 2, wherein the first switch circuit comprises a first switching transistor, where a control terminal of the first switching transistor is coupled to the BUCK chip, and the BUCK chip is configured to control a connection status of the first switching transistor, and wherein one end of a switching channel of the first switching transistor is coupled to the LDO chip, and the other end of the switching channel is coupled to the power source management chip.

4. The circuit of claim 2, further comprising a sensor configured to detect opening or closing of a notebook computer, wherein the sensor is couple to the first switch circuit and the second switch circuit, and the sensor is coupled to the power source management chip and configured to send a detection signal to the power source management chip.

5. The circuit of claim 1, wherein the first switch circuit comprises a first switching transistor, wherein a control terminal of the first switching transistor is coupled to the BUCK chip, and the BUCK chip is configured to control a connection status of the first switching transistor, and wherein one end of a switching channel of the first switching transistor is coupled to the LDO chip, and the other end of the switching channel is coupled to the power source management chip.

6. The circuit of claim 5, wherein the first switching transistor is a P-type metal-oxide-semiconductor (PMOS) transistor, a source of the first switching transistor is coupled to an output pin of the LDO chip, a drain of the first switching transistor is coupled to the power source management chip, and a gate of the first switching transistor is coupled to a power good pin of the BUCK chip.

7. The circuit of claim 1, wherein the second switching transistor is an N-type metal-oxide-semiconductor (NMOS) transistor, and the third switching transistor is a P-type metal-oxide-semiconductor (PMOS) transistor, wherein a drain and a source of the second switching transistor are respectively coupled to the system power source and a reference ground potential, and a gate of the second switching transistor is coupled to a power good pin of the BUCK chip, and wherein a source of the third switching transistor is coupled to an output pin of the BUCK chip, a drain of the third switching transistor is coupled to the power source management chip, and a gate of the third switching transistor is coupled to the drain of the second switching transistor.

8. The circuit of claim 1, further comprising a sensor configured to detect opening or closing of a notebook computer, wherein the sensor is coupled to the first switch circuit and the second switch circuit, and the sensor is coupled to the power source management chip to send a detection signal to the power source management chip.

9. The circuit of claim 8, wherein the power source management chip is configured to send a control signal to the BUCK chip based on the detection signal from the sensor, wherein the BUCK chip is controlled to be in a non-working state when the control signal is a low-level signal, and wherein the BUCK chip is controlled to be in the working state when the control signal is a high-level signal.

10. The circuit of claim 1, further comprising a Hall effect sensor coupled to the power source management chip, wherein the Hall effect sensor is configured to send a detection signal to the power source management chip, and the power source management chip is configured to generate a control signal in response to the detection signal, and wherein the detection signal is configured to represent an opening and closing state between an upper lid and a body of a notebook computer.

11. An electronic device, comprising:
a power source switching circuit, comprising:
a system power source;
a power source management chip;
a low-dropout (LDO) power supply system, comprising:
an LDO chip coupled to the system power source, wherein the LDO chip is in a working state; and
a first switch circuit, wherein the power source management chip is coupled to the LDO chip by the first switch circuit; and
a BUCK power supply system, comprising:
a BUCK chip coupled to the system power source; and
a second switch circuit, wherein the power source management chip is coupled to the BUCK chip by the second switch circuit, and the power source management chip is configured to control a status of the BUCK chip, the second switch circuit comprising:
a second switching transistor, wherein a control terminal of the second switching transistor is coupled to the BUCK chip, and the BUCK chip is configured to control a connection status of the second switching transistor; and
a third switching transistor, wherein a control terminal of the third switching transistor is coupled to a switching channel of the second switching transistor, and the connection status of the second switching transistor controls a connection status of the third switching transistor, and wherein one end of a switching channel of the third switching transistor is coupled to the BUCK chip, and the other end of the switching channel is coupled to the power source management chip,
wherein both the first switch circuit and the second switch circuit are coupled to the BUCK chip, and the BUCK chip is configured to control one of the first switch circuit and the second switch circuit to be in a closed state.

12. The electronic device of claim 11, further comprising an upper lid and a body, wherein the power source switching circuit further comprises a Hall effect sensor coupled to the power source management chip, wherein the Hall effect sensor is configured to send a detection signal to the power source management chip, and the power source management chip is configured to generate a control signal in response to the detection signal, and wherein the detection signal is configured to represent an opening and closing state between the upper lid and the body.

13. The electronic device of claim 12, wherein the power source management chip is configured to output the control signal to control the status of the BUCK chip.

14. The electronic device of claim 11, wherein the status of the BUCK chip comprises a working state and a non-working state, wherein the first switch circuit is in the closed state and the second switch circuit is in an open state when the BUCK chip is in the non-working state, and wherein the first switch circuit is in an open state and the second switch circuit is in the closed state when the BUCK chip is in the working state.

15. The electronic device of claim 11, wherein the first switch circuit comprises a first switching transistor, wherein a control terminal of the first switching transistor is coupled to the BUCK chip, and the BUCK chip is configured to control a connection status of the first switching transistor, and wherein one end of a switching channel of the first switching transistor is coupled to the LDO chip, and the other end of the switching channel is coupled to the power source management chip.

16. The electronic device of claim 15, wherein the first switching transistor is a P-type metal-oxide-semiconductor (PMOS) transistor, a source of the first switching transistor is coupled to an output pin of the LDO chip, a drain of the first switching transistor is coupled to the power source management chip, and a gate of the first switching transistor is coupled to a power good pin of the BUCK chip.

17. The electronic device of claim 11, wherein the power source management chip is configured to output a control signal to control the status of the BUCK chip.

18. The electronic device of claim 11, wherein the second switching transistor is an N-type metal-oxide-semiconductor (NMOS) transistor, and the third switching transistor is a P-type metal-oxide-semiconductor (PMOS) transistor, wherein a drain and a source of the second switching transistor are respectively coupled to the system power source and a reference ground potential, and a gate of the second switching transistor is coupled to a power good pin of the BUCK chip, and wherein a source of the third switching transistor is coupled to an output pin of the BUCK chip, a drain of the third switching transistor is coupled to the power source management chip, and a gate of the third switching transistor is coupled to the drain of the second switching transistor.

* * * * *